US010452675B1

(12) United States Patent
Sivasubramanian

(10) Patent No.: US 10,452,675 B1
(45) Date of Patent: Oct. 22, 2019

(54) SOURCE DETECTION AND INDEXING FOR MANAGED SEARCH

(71) Applicant: Amazon Technologies, Inc., Reno, NV (US)

(72) Inventor: Swaminathan Sivasubramanian, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 653 days.

(21) Appl. No.: 14/985,153

(22) Filed: Dec. 30, 2015

(51) Int. Cl.
G06F 16/25 (2019.01)
G06F 16/22 (2019.01)
G06F 16/9535 (2019.01)

(52) U.S. Cl.
CPC ........ G06F 16/254 (2019.01); G06F 16/2228 (2019.01); G06F 16/9535 (2019.01)

(58) Field of Classification Search
None
See application file for complete search history.

(56) References Cited

U.S. PATENT DOCUMENTS

| 7,383,253 | B1 | 6/2008 | Tsimelzon et al. |
| 7,580,919 | B1* | 8/2009 | Hannel ............. G06F 17/30418 |
| 9,122,710 | B1 | 9/2015 | Jeffrey et al. |
| 9,274,617 | B2* | 3/2016 | Lee ..................... G06F 3/03543 |
| 2001/0020237 | A1 | 9/2001 | Yarnall et al. |
| 2005/0114704 | A1 | 5/2005 | Swander |
| 2009/0171707 | A1* | 7/2009 | Bobak ................... G06Q 10/06 705/7.23 |
| 2011/0252033 | A1 | 10/2011 | Narang et al. |
| 2012/0144054 | A1 | 6/2012 | Van Velzen et al. |
| 2012/0197856 | A1 | 8/2012 | Banka et al. |
| 2013/0138425 | A1 | 5/2013 | Luke |
| 2015/0178358 | A1 | 6/2015 | Baessler et al. |
| 2016/0224570 | A1 | 8/2016 | Sharp et al. |
| 2017/0139802 | A1 | 5/2017 | Hajiyev et al. |

OTHER PUBLICATIONS

Non-Final Office Action issued in corresponding U.S. Appl. No. 14/985,209 dated Apr. 6, 2018.
Final Office Action issued in corresponding U.S. Appl. No. 14/985,209 dated Dec. 14, 2018.
Non-Final Office Action issued in corresponding U.S. Appl. No. 14/985,172 dated Apr. 25, 2018.
Final Office Action issued in corresponding U.S. Appl. No. 14/985,172 dated Jan. 23, 2019.
Non-Final Office Action issued in corresponding U.S. Appl. No. 14/985,209 dated Apr. 19, 2019.

* cited by examiner

Primary Examiner — Tuankhanh D Phan
(74) Attorney, Agent, or Firm — Hogan Lovells US LLP

(57) ABSTRACT

A data discovery service provides an automated method of identifying and indexing data sources associated with a user's account without requiring additional configuration by the user. This enables search services to be provided across various different types of data sources a user may utilize. The data discovery service can generate a list of data sources associated with the user's account, the list may include access information for each data source. Each data source or type of data source may be associated with an index policy that identifies the types of data from a corresponding data source are to be indexed. An index may then be generated based on those policies for each data source associated with the account.

22 Claims, 7 Drawing Sheets

SOURCE DETECTION AND INDEXING FOR MANAGED SEARCH

Increasingly, users are storing data using cloud-based storage services. These storage services may include various different types of storage such as object storage services, file storage services, database systems to store relational and non-relational data, etc. Each of these storage services may be associated with different methods to access and manage the data stored therein. These access methods typically include a search feature. Search is an access method that is popular among files, structured database, and relational databases. Full-text search is a popular way to analyze log files, web pages and many other file types. Beyond its use for Web pages, search has been a popular access method for even operational analytics and other business data. In databases, search has been a growingly popular function not only on traditional relational databases but also on NoSQL databases. However, implementing search functionality across multiple data sources can be complex and resource intensive. For example, to enable full text search for a user's data sources, the user must select a search engine (e.g., SOLR, Lucene or ElasticSearch, or other search engine), setup replication groups, and perform the appropriate installation. The user must also setup an ETL job to copy the data from each data source to a search node and define the appropriate indexes they would like to search on their data. Because the user's data may change, this ETL job must be run periodically to make sure that their search index is up to date. In addition, as the user must scale the search index as the amount of data being searched changes.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for managed search in an electronic environment. In particular, various embodiments provide a data discovery service that is configured to identify data sources associated with an account and index the data sources.

In some embodiments, a data discovery service can provide an automated method of identifying and indexing data sources associated with a user's account without requiring additional configuration by the user. This enables search services to be provided across various different types of data sources a user may utilize. The data discovery service can generate a list of data sources associated with the user's account, the list may include access information for each data source. Each data source or type of data source may be associated with an index policy that identifies the types of data from a corresponding data source are to be indexed. An index may then be generated based on those policies for each data source associated with the account.

Various other functions can be implemented within the various embodiments as well as discussed and suggested elsewhere herein.

Figure 1:
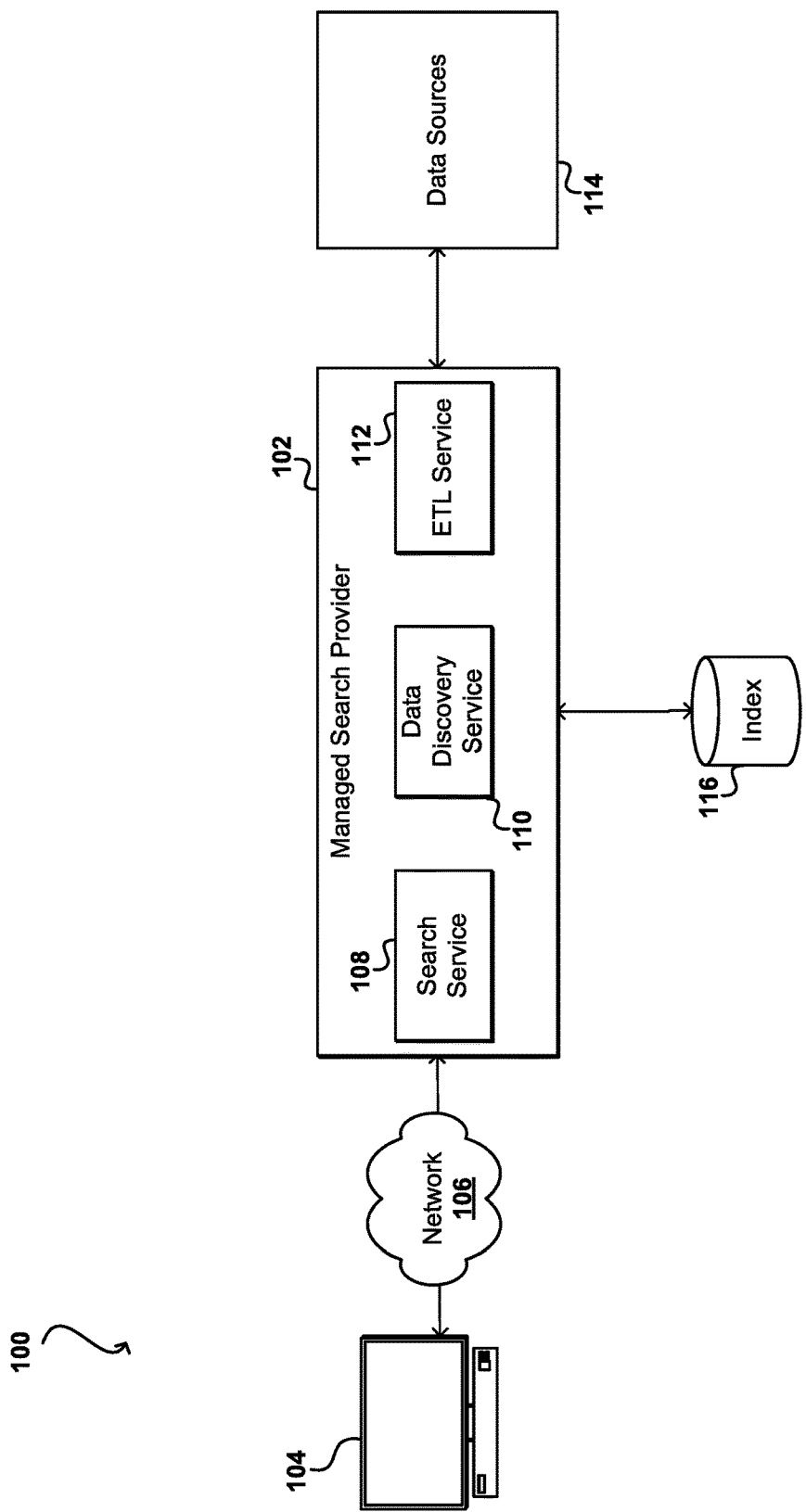
FIG. 1 illustrates an example system that provides managed search for various data sources, in accordance with various embodiments.

FIG. 1 illustrates an example system 100 that provides managed search for various data sources, in accordance with various embodiments. As discussed, typical search offerings require users to configure the indexes in their search engine, design, build, and operate data source specific ETL programs to move data from their data sources, transform the data to an appropriate format compatible with their search engine, and to scale their search implementation as appropriate. Further, the search indexes must be kept up to date, leading to ongoing maintenance of the system as source data changes in their database or storage systems. Embodiments of the present invention provide a managed search system that address these and other problems.

As shown in FIG. 1, a managed search provider 102 can provide highly available, high scalable search functionality across a user's data sources. The managed search provider 102 can include any appropriate components for receiving requests and returning information or performing actions in response to those requests. As an example, the provider environment might include Web servers and/or application servers for receiving and processing requests, then returning data, Web pages, video, audio, or other such content or information in response to the request. A user can access managed search provider 102 using a client device 104 over at least one network 106. The client device can include any appropriate electronic device operable to send and receive requests, messages, or other such information over an appropriate network and convey information back to a user of the device. Examples of such client devices include personal computers, tablet computers, smart phones, notebook computers, and the like. In some embodiments, a client device 104 can be an electronic device in another service or environment configured to send resource requests to managed search provider 102. The at least one network 106 can include any appropriate network, including an intranet, the Internet, a cellular network, a local area network (LAN), or any other such network or combination, and communication over the network can be enabled via wired and/or wireless connections.

In some embodiments, managed search provider 102 can include a search service 108 that is configured to search various data sources associated with a user's account. Rather than requiring the user to manually identify and configure each data source, a data discovery service 110 can automatically identify the data sources and index the data sources. In some embodiments, once data discovery service 110 has identified the data sources associated with the user's account, an ETL service 112 can be used to enable full-text indexing on the user's data stored in data sources 114. Data sources 114 may include big data sources (e.g., AWS S3, DynamoDB, etc.), relational data sources (e.g., RDS, Aurora, relational databases on AWS EC2 and on-premise, etc.), and streaming data sources (e.g., Kinesis, DynamoDB Streams, etc.). An index 116 for each data source can be stored a highly available manner (e.g., by replicating the underlying search indexes), and can be configured to scale automatically as the corresponding source data grows. In some embodiments, data can be indexed in real-time by connecting to event streams produced by the data sources 114. Search service 108 may then use the indexes to search the various data sources associated with the user's account and return results. This way, managed search provider 102 can provide full-text searching of various data sources without requiring significant development or maintenance by the user.

As discussed, managed search provider 102 can provide scalable managed search services to users. Managed search provider 102 can be associated with a resource provider environment, as discussed further below, to manage provisioning and deploying instances as needed to accommodate a user's managed search needs.

Figure 2:
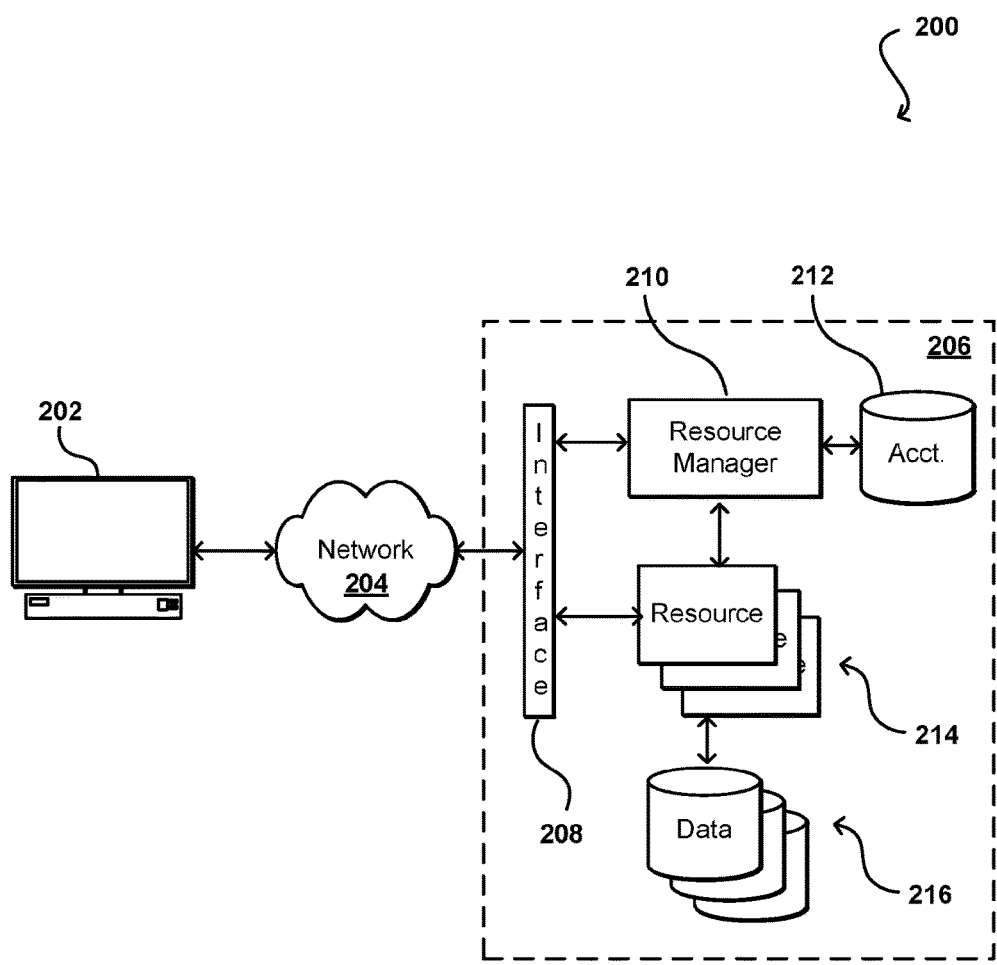
FIG. 2 illustrates an example environment in which various embodiments can be implemented.

FIG. 2 illustrates an example environment 200 in which aspects of the various embodiments can be implemented. In this example a user is able to utilize a client device 202 to submit requests across at least one network 204 to a resource provider environment 206. The client device can include any appropriate electronic device operable to send and receive requests, messages, or other such information over an appropriate network and convey information back to a user of the device. Examples of such client devices include personal computers, tablet computers, smart phones, notebook computers, and the like. In some embodiments, a client device 202 can be an electronic device in another service or environment configured to send resource requests to resource provider environment 206. The at least one network 204 can include any appropriate network, including an intranet, the Internet, a cellular network, a local area network (LAN), or any other such network or combination, and communication over the network can be enabled via wired and/or wireless connections. The resource provider environment 206 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment (or multi-tenant environment) is often referred to as resource sharing, Web services, or "cloud computing," among other such terms and depending upon the specific environment and/or implementation. In this example the provider environment includes a plurality of resources 214 of one or more types. These types can include, for example, application servers operable to process instructions provided by a user or database servers operable to process data stored in one or more data stores 216 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 214 can submit a request that is received to an interface layer 208 of the provider environment 206. The interface layer can include application programming interfaces (APIs) or other exposed interfaces enabling a user to submit requests to the provider environment. The interface layer 208 in this example can also include other components as well, such as at least one Web server, routing components, load balancers, and the like. When a request to provision a resource is received to the interface layer 208, information for the request can be directed to a resource manager 210 or other such system, service, or component configured to manage user accounts and information, resource provisioning and usage, and other such aspects. A resource manager 210 receiving the request can perform tasks such as to authenticate an identity of the user submitting the request, as well as to determine whether that user has an existing account with the resource provider, where the account data may be stored in at least one data store 212 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 202 to communicate with an allocated resource without having to communicate with the resource manager 210, at least until such time as a relevant aspect of the user account changes, the user is no longer granted access to the resource, or another such aspect changes.

The resource manager 210 (or another such system or service) in this example can also function as a virtual layer of hardware and software components that handles control functions in addition to management actions, as may include provisioning, scaling, replication, etc. The resource manager can utilize dedicated APIs in the interface layer 208, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 208 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 3:
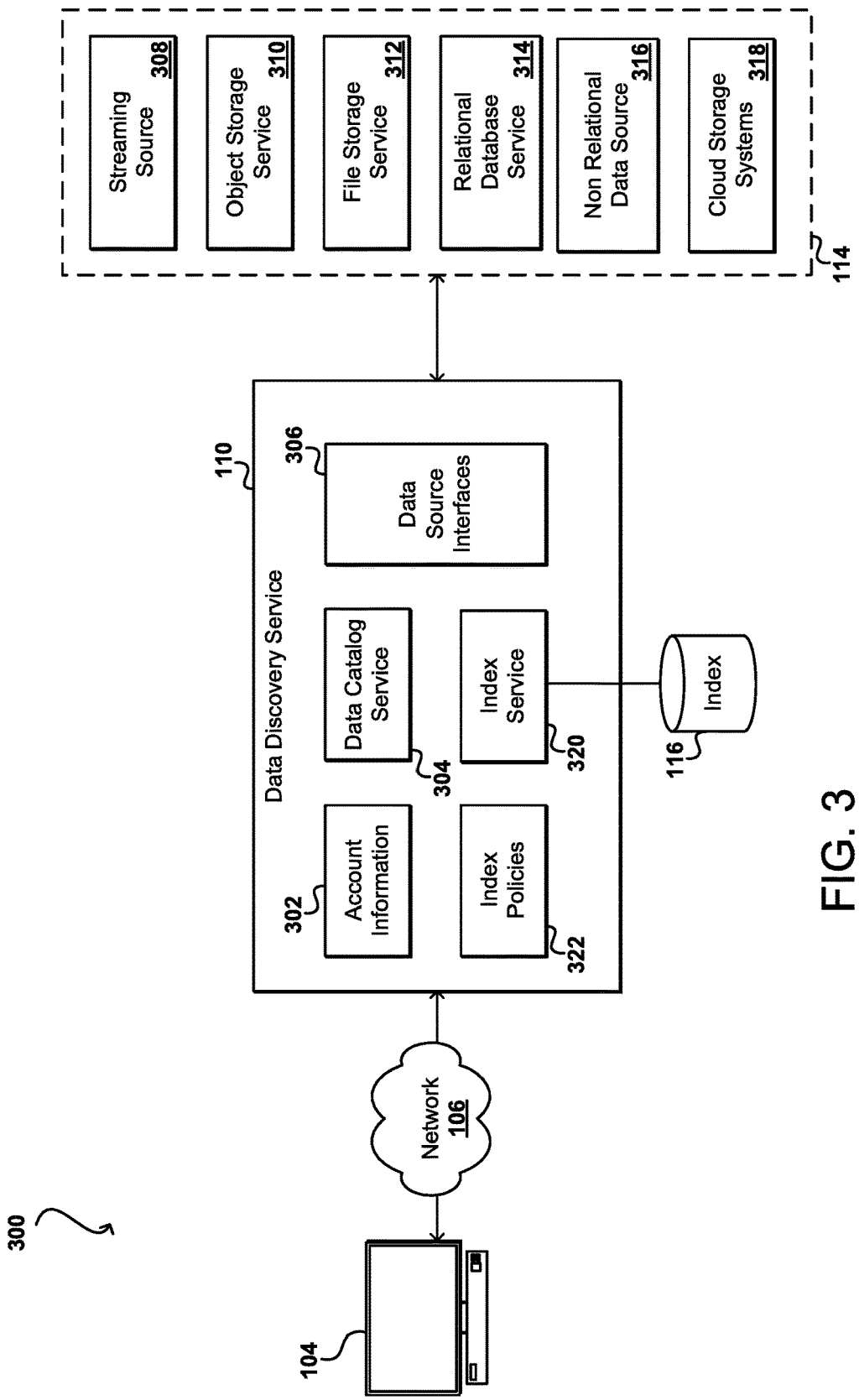
FIG. 3 illustrates an example system that provides data discovery and indexing services, in accordance with various embodiments.

FIG. 3 illustrates an example system 300 that provides data discovery and indexing services, in accordance with various embodiments. As shown in FIG. 3, a user can send a request to data discovery service 110, using client device 104, to identify data sources 114 associated with the user's account. In some embodiments, the user can provide account credentials with the request. In some embodiments, data discovery service 110 can access account information 302 associated with the user using the account credentials from the user. The account information 302 can include data source credentials and/or access information for various data sources 114 associated with the user's account. A data catalog service 304 can access each data source 114 through one or more data source interfaces 306. Each type of data source may be associated with a different data source interface which may define how that type of data source is accessed and how updates can be retrieved from that type of data source. In some embodiments, data catalog service 304 can maintain a list of data sources 114 associated with the user's account. In some embodiments, data catalog service 304 can periodically attempt to access each data source 114 using corresponding account credentials maintained in account information 302. If the access fails for a particular data source, data catalog service can request new account credentials and/or remove the particular data source from the list of data sources.

In some embodiments, data sources 114 can include streaming sources 308 (e.g., AWS Kinesis), object storage services 310, file storage services 312, database systems 314 (e.g., RDS, Aurora, etc.), non-relational database systems 316 (e.g., DynamoDB and other NoSQL data stores), and other cloud-based storage systems 318. Although particular types of data sources are described, other data sources may also be used with various embodiments. For example, to support a new type of data source, data source interfaces 306 can be updated to include corresponding access methods and update notification methods for that new type of data source.

Traditional indexing services can be used with only some types of data sources or formats of data, which requires users to configure various different services to index all of their data. Additionally, in traditional indexing services the user must manually create ETL jobs for each data source. In some embodiments, index service 320 can automatically index data from each data source 114 associated with a user's account identified by data catalog service 304. For example, index service 320 can generate an ETL job for each data source without additional user input. Index service 320 can create the ETL job for a data source using the corresponding access methods of data source interface 306 and designate index 116 as the target data store for the ETL job. Each ETL job can identify data in the corresponding data source and parse the data to generate an index for the data source. Embodiments of the present invention can tokenize the data and analyze it according to known search indexing techniques. Based on the amount of data being indexed, index service 320 can automatically scale index 116. In some embodiments, index service 320 can replicate the indexes stored in index 116 across multiple data stores.

In some embodiments, index service 320 can index data from data sources 114 based on one or more index policies 322. Index policies 322 can include default policies provided by managed search provider 102. For example, a default policy may be to index all fields associated with a data source. In some embodiments, default index policies can be provided for each type of data source and/or for each particular data source. Index policies 322 can include user-specified policies in addition, or as an alternative, to default policies. In some embodiments, index policies may be maintained for each data source and/or type of data source in a look-up table or other data structure. The index service 320 can determine the index policy for a data source by searching the data structure. In some embodiments, index service can cause a policy customization interface to be displayed on client device 104. The policy customization interface can receive selections from users of particular data sources, data sets, fields, formats, or other features of data that the user wants to be indexed. In some embodiments, a user may choose to exclude particular data sources or data sets from being indexed.

Figure 4:
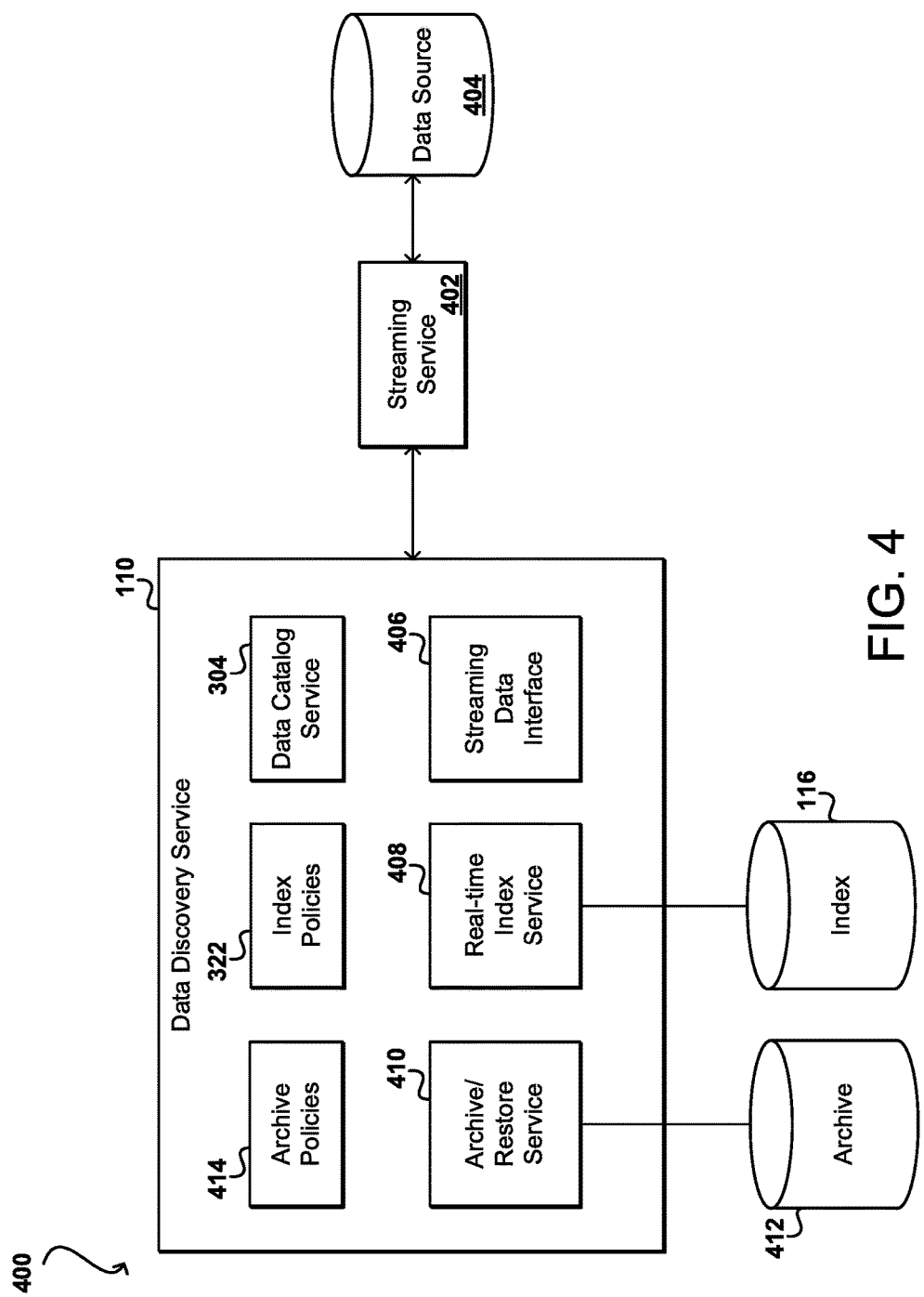
FIG. 4 illustrates an example system that provides indexing and archiving services for streaming data sources, in accordance with various embodiments.

FIG. 4 illustrates an example system 400 that provides indexing and archiving services for streaming data sources, in accordance with various embodiments. As discussed, in some embodiments data discovery service 110 can identify streaming data sources associated with a user's account. A streaming service 402 can collect data in real-time from a streaming data source 404. Streaming data may include clickstream data, update data, and other event-driven data. Streaming data interface 406 can subscribe to one or more data streams exposed by streaming service 402. In some embodiments, real-time index service 408 can automatically index data from received from streaming service 402 through streaming data interface 406 in real time. For example, real-time index service 408 can generate an ETL job for each data stream from streaming service 402 without additional user input. Each ETL job can parse data in the corresponding data stream to generate an index for the data stream. As discussed, indexing the data can include tokenizing the data and analyzing it according to known search indexing techniques. Each index can be stored in index 116.

In some embodiments, index policies 322 can include default policies for streaming data sources. For example, a default policy may be to index all fields associated with a data source. In some embodiments, default index policies can be provided for each type of data source and/or for each particular data source. As discussed, index policies 322 can include user-specified policies in addition, or as an alternative, to default policies. In some embodiments, as discussed, a user can customize a policy using a policy customization interface. The policy customization interface can receive selections from users of particular data streams, fields, formats, or other features of data that the user wants to be indexed. In some embodiments, a user may choose to exclude particular data streams, fields, or other features from being indexed.

In some embodiments, archive/restore service 410 can manage indexes for data streams. Archive/restore service 410 can archive indexes for data streams indexed by real-time index service 408. Archive/restore service 410 can be configured to archive the indexes when an archive event is detected. The archive event can be, e.g., based on a size of the index and/or based on an index time (e.g., a period of time the data stream has been indexed since the last archive). For example, some users may utilize data stream indexes within a particular period of time after the data from the data stream is received. The archive/restore service 410 can then be configured to archive the corresponding index after the particular period of time and store the index in archive 412. When an index is archived, it can be transmitted from the index 116 to archive 412 and can be associated with one or more timestamps corresponding to a time period during which the index was generated. In some embodiments, a user may define archive policies 414 that schedule archives based on time or a detected event, such as the index reaching a predefined size. In some embodiments, archive policies may be maintained for each data source and/or type of data source in a look-up table or other data structure. The archive/restore service 410 can determine the archive policy for a data source by searching the data structure. The data from the data stream can then be indexed for another particular period of time before it is archived to archive 412. If a user requests to search data that has been archived, the index can be restored by archive/restore service 410. For example, a user may request to search data that was indexed during a particular time period. Archive/restore service 410 can identify one or more archived indexes that cover that time period and move the corresponding indexes from archive 412 to index 116 where it may then be used to search the corresponding data from the data stream. In some embodiments, a request to restore data from a particular time period can be received. Archive/restore service 410 can identify the archived indexes that cover that time period and move the corresponding indexes from archive 412 to index 116. In some embodiments, archive policies can be customized by a user to specify archive events that trigger the archive/restore service to archive the current index. For example, the user may specify the index time and/or index size that triggers the index to be archived.

Figure 5:
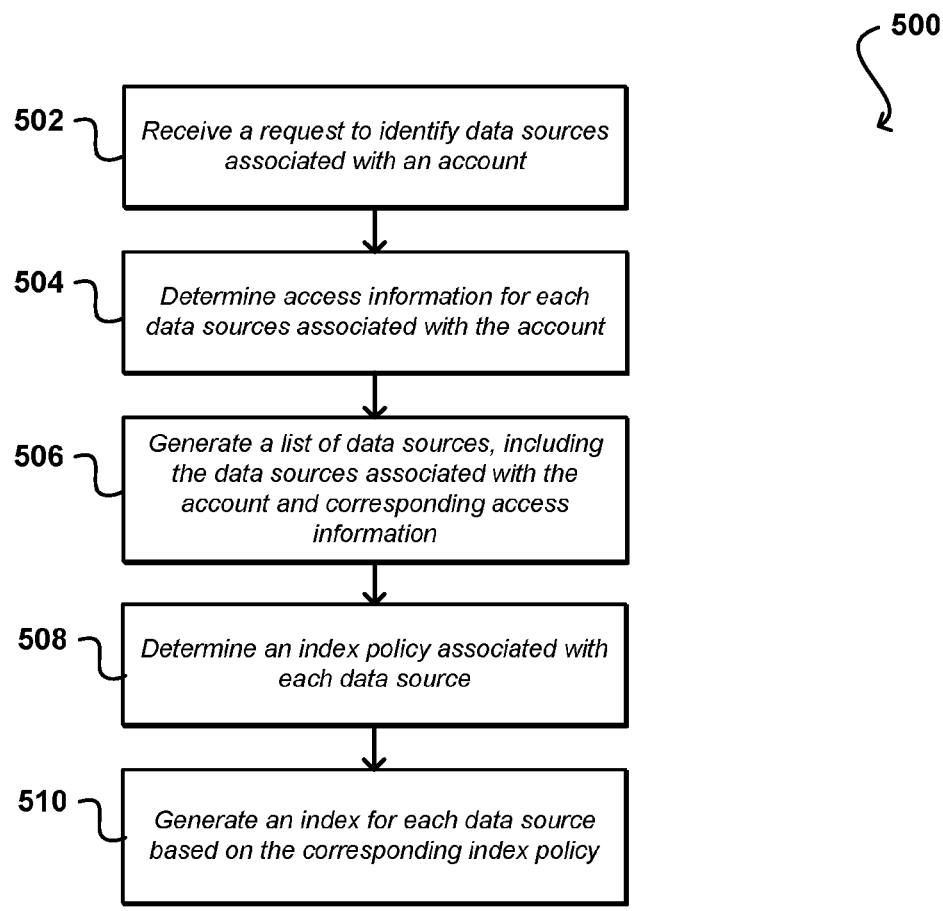
FIG. 5 illustrates an example process for discovering and indexing data sources that can be utilized in accordance with various embodiments.

FIG. 5 illustrates an example process 500 for discovering and indexing data sources that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, a request can be received 502 to identify data sources associated with an account of a service provider. As discussed, the data sources can include object data sources, file system data sources, databases, streaming data sources, or other data sources. Access information can be determined 504 for each data source associated with the account. For example, a data catalog service can send a request to the service provider for access information for each data source associated with the account. Credential information may include a username and password, certificate, key, or other credential.

A list of data sources can be generated 506 which includes the data sources associated with the account and each data source's corresponding access information. For example, the data catalog service can use the credential information to request access to each data source. If the request is successful, the data source can be added to the list of data sources. In some embodiments, the list of data source can be maintained by periodically requesting access to the data sources on the list. If the request is unsuccessful the data source can be removed from the list or a request can be sent for updated access information.

In various embodiments, an index policy can be determined 508 for each data source. The index policy can identify at least one type of data to index from the corresponding data source. In some embodiments, index policies can be defined for particular data sources and/or types of data sources. As discussed, the index policy can include a default index policy and/or a user-specified index policy. A user-specified index policy can be received through a policy customization interface and may include a selection of types of data, data fields, data formats, or other data features to be indexed. In some embodiments, the index policies may specify the types of data not to be indexed. An index may then be generated 510 for each data source based on the index policies. In some embodiments, an index may be generated by generating an ETL job identifying the data source and an index data store. The indexes may be stored in the index data store.

Figure 6:
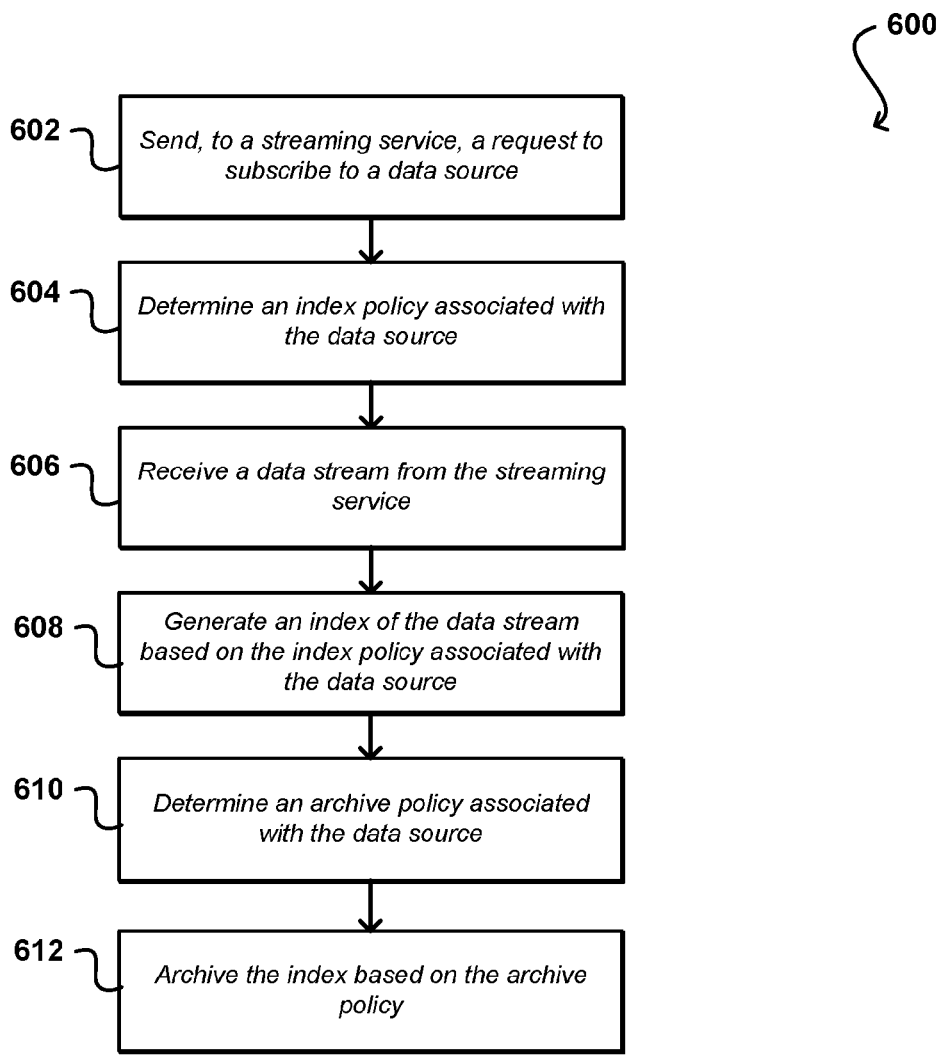
FIG. 6 illustrates an example process for indexing and archiving streaming data sources that can be utilized in accordance with various embodiments.

FIG. 6 illustrates an example process 600 for indexing and archiving streaming data sources that can be utilized in accordance with various embodiments. As shown in FIG. 6, a request can be sent 602 to a streaming service to subscribe to a data stream. The data stream can be associated with one or more streaming data sources. A streaming data source can collect data from various users in real time and publish the data to the streaming service. In some embodiments, a request can first be received from a service provider to index the streaming data source. An index policy associated with the streaming data source can be determined 604. As discussed, the index policy can identify types of data to be indexed from the data stream.

In some embodiments, data can be received 606 from the streaming service after subscribing to the data stream. An index of the data stream can be generated 608 in real time based on the index policy associated with the data source. As discussed, the index can be stored in an index data store. In various embodiments, an archive policy associated with the data source can be determined 610. The archive policy can identify an archive event and an archive data store associated with the data source. In some embodiments, the archive event can include an index size and/or an index time. For example, when the index has reached a particular size, the index can be archived and a new index can be generated. Similarly, an index may be archived after a particular amount of time has elapsed since the last archive. In some embodiments, an archive policy can be customized by a user through a policy customization interface in which the user may specify one or more archive events to trigger archiving an index.

When an archive event is detected, the index can be archived 612. Archiving may include transmitting the index from the index data store to the archive data store and generating a new index of the data stream based on the index policy. In some embodiments, the index can be stored in the archive data store with one or more timestamps corresponding to a time period during which the index was generated. In some embodiments, a request to restore archived data corresponding to a time period can be received. Using the timestamps associated with the archived indexes, one or more archived indexes associated with the requested data can be identified. These indexes can then be transmitted from the archive data store to the index data store.

Figure 7:
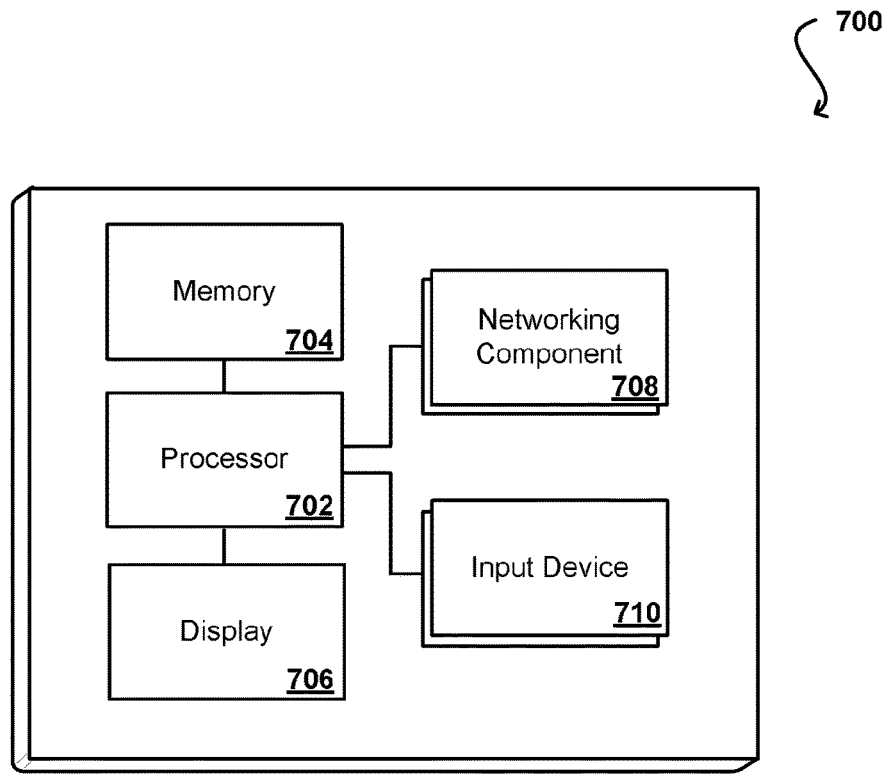
FIG. 7 illustrates example components of a computing device that can be used to implement aspects of various embodiments.

FIG. 7 illustrates a set of basic components of an example computing device 700 that can be utilized to implement aspects of the various embodiments. In this example, the device includes at least one processor 702 for executing instructions that can be stored in a memory device or element 704. As would be apparent to one of ordinary skill in the art, the device can include many types of memory, data storage or computer-readable media, such as a first data storage for program instructions for execution by the at least one processor 702, the same or separate storage can be used for images or data, a removable memory can be available for sharing information with other devices, and any number of communication approaches can be available for sharing with other devices. The device may include at least one type of display element 706, such as a touch screen, electronic ink (e-ink), organic light emitting diode (OLED) or liquid crystal display (LCD), although devices such as servers might convey information via other means, such as through a system of lights and data transmissions. The device typically will include one or more networking components 708, such as a port, network interface card, or wireless transceiver that enables communication over at least one network. The device can include at least one input device 710 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving a first request to identify a plurality of data sources associated with an account of a service provider;
sending, by a data catalog service, a second request to the service provider for access information associated with the plurality of data sources;
generating a list of data sources, the list of data sources including one or more data sources from the plurality of data sources, wherein generating the list of data sources includes, for each data source of the plurality of data sources:
sending a third request to access the data source through a data source interface, the third request including the access information associated with the data source;
determining the third request to access the data source is successful; and
adding the data source and the corresponding access information to the list of data sources;
for each data source in the list of data sources:
generating a data source index based, at least in part, on a corresponding index policy, the index policy being customizable;
reducing a size of the data source index if the index for the data source exceeds a threshold size, the size of the data source index corresponding to a number of items listed within the data source index; and
storing the index for the data source in the list of data sources in an index data store.

2. The computer-implemented method of claim 1, further comprising:
sending, by the data catalog service, a fourth request to access a first data source on the list of data sources;
determining, for the first data source, that the fourth request failed; and
removing the first data source from the list of data sources.

3. The computer-implemented method of claim 1, wherein generating an index for the data source based on the corresponding index policy further comprises:
generating an ETL job identifying the data source and an index data store.

4. The computer-implemented method of claim 1, wherein the plurality of data sources includes at least one of an object data source, a file system data source, a database, or a streaming data source.

5. A computer-implemented method, comprising:
determining, by a data catalog service, a plurality of data sources associated with an account of a service provider;
receiving access information for the plurality of data sources; and
generating a list of data sources, the list of data sources including the plurality of data sources and the access information corresponding to the plurality of data sources;
for each data source in the list of data sources:
determining an index policy for the data source in the list of data sources, the index policy including at least one type of data to index from the corresponding data source;
generating an index for the data source based on the corresponding index policy, the index policy being customizable; and
reducing a size of the index if the index for the data source exceeds a threshold size, the size of the data source index corresponding to a number of items listed within the data source index.

6. The computer-implemented method of claim 5, further comprising:
sending, by the data catalog service, a request to access a first data source on the list of data sources;
determining, for the first data source, that the request failed; and
removing the first data source from the list of data sources.

7. The computer-implemented method of claim 5, further comprising:
sending, by the data catalog service, a first request to access a first data source on the list of data sources;
determining, for the first data source, that the first request failed; and
sending a second request to the client device for new access information for the first data source.

8. The computer-implemented method of claim 5, wherein the index policy includes at least one of a default index policy and a user-specified index policy.

9. The computer-implemented method of claim 8, wherein the default index policy defines that all fields are indexed.

10. The computer-implemented method of claim 8, wherein determining an index policy for the data source in the list of data sources, further comprises:
receiving a request to customize the index policy for a type of data source;
causing a policy customization interface to be displayed on the client device; and
receiving a selection of data to be indexed.

11. The computer-implemented method of claim 10, wherein the selection of data includes at least one of a data field, a data set, or a data format.

12. The computer-implemented method of claim 5, wherein generating an index for the data source based on the corresponding index policy further comprises:
generating an ETL job identifying the data source and an index data store.

13. The computer-implemented method of claim 5, wherein the plurality of data sources includes at least one of an object data source, a file system data source, a non relational database, a relational database, or a streaming data source.

14. A system, comprising:
at least one processor; and
memory including instructions that, when executed by the at least one processor, enable the system to:
determine, by a data catalog service, a plurality of data sources associated with an account of a service provider;
receive access information for the plurality of data sources; and
generate a list of data sources, the list of data sources including the plurality of data sources and the access information corresponding to the plurality of data sources;
for each data source in the list of data sources:
determine an index policy for the data source in the list of data sources, the index policy at least one type of data to index from the corresponding data source;

generate an index for the data source based on the corresponding index policy, the index policy being customizable; and reduce a size of the index if the index for the data source exceeds a threshold size, the size of the data source index corresponding to a number of items listed within the data source index.

15. The system of claim 14, wherein the instructions, when executed by the at least one processor, further enable the system to:

periodically send, by the data catalog service, a request to access each data source on the list of data sources;

determine, for a first data source, that the request failed; and remove the first data source from the list of data sources.

16. The system of claim 14, wherein the instructions, when executed by the at least one processor, further enable the system to:

send, by the data catalog service, a first request to access a first data source on the list of data sources;

determine, for the first data source, that the first request failed; and send a second request to the client device for new access information for the first data source.

17. The system of claim 14, wherein the index policy includes at least one of a default index policy and a user-specified index policy.

18. The system of claim 17, wherein the default index policy defines that all fields are indexed.

19. The system of claim 17, wherein the instructions, when executed to determine an index policy for the data source in the list of data sources, further enable the system to:

receive a request to customize the index policy for a type of data source;

cause a policy customization interface to be displayed on the client device; and receive a selection of data to be indexed.

20. The system of claim 19, wherein the selection of data includes at least one of a data field, a data set, or a data format.

21. The system of claim 14, wherein the instructions, when executed to generate an index for the data source based on the corresponding index policy, further enable the system to:

generate an ETL job identifying a data source and an index data store.

22. The system of claim 14, wherein each data source includes at least one of an object data source, a file system data source, a non relational database, a relational database, or a streaming data source.

* * * * *